Patented Dec. 4, 1951

2,577,280

UNITED STATES PATENT OFFICE 2,577,280

CELLULAR PLASTIC MATERIAL

Eli Simon, Los Angeles, and Frank W. Thomas, Burbank, Calif., assignors to Lockheed Aircraft Corporation, Burbank, Calif.

No Drawing. Application September 18, 1948, Serial No. 50,007

1 Claim. (Cl. 260—2.5)

This invention relates to cellular plastic materials and to methods for making the same.

Heretofore the methods usually employed to produce cellular or foamed plastics and rubbers have been exceedingly complicated and often necessitated the emloyment of extensive, costly equipment. Furthermore, with the earlier conventional methods it was not possible to directly introduce the material into a space or cavity to polymerize therein and to bond or adhere with its walls to form a permanent part, lamination, or element of a structure, but it was necessary to previously compound and form the cellular material and then install the finished or completed material in its intended final position. Examples of the typical methods employed in a production of cellular materials are the solution of a gas in an undercured rubber which is held under high pressure with the slow controlled release of the pressure while subjecting the rubber to vulcanizing temperatures; and the incorporation of foaming agents in heat sensitive plastics with the subsequent subjection of the plastics to heat and pressure with the controlled release of pressure. Such procedures are expensive and time consuming and are not adapted to the production of cellular or foamed plastics in cavities to which they are to permanently adhere.

In our co-pending application, Serial No. 35,294, filed June 25, 1948, we disclosed a method for producing light-weight cellular plastics wherein the plastic and its foaming agent or agents are simply mixed together and poured into the cavity or otherwise applied to directly and finally bond with the surfaces and to assume its ultimate cellular condition. This we accomplished by employing water as the foaming agent component for an alkyd resin-poly isocyanate mixture and by incorporating the foaming component water either through the use of a metallic salt hydrate or in conjunction with a non-ionic wetting agent. The alkyd resin employed had a known relatively low water content and the introduction of controlled proportions of the foam inducing water by the use of the metallic salt hydrate or in conjunction with the non-ionic wetting agent produced a practical low density cellular material. We have found that by adding or incorporating metallic soap powders, or such metallic soap powders and leafing metallic powders, in the alkyd resin-poly isocyanate mixture a superior low density foamed plastic of more uniform cellular structure is obtained. The metallic soap powders which have been found to be effective are metallic soaps of fatty acids having from 12 to 20 carbon atoms and the term "leafing powders" as herein employed refers to a material having a property of leafing when suspended in a suitable liquid vehicle and when suspended in such a vehicle and applied as a paint has the ability of forming a continuous film at the surface of the applied vehicle or paint. Such leafing powders should exhibit good leafing properties in paint to the end that paint containing the same is free flowing and produces a continuous smooth lustrous coating.

Isocyanates are reactive molecules which form addition products with labile or active hydrogen atoms. As an illustration, an isocyanate, such as R—N=C=O, where R represents an alkyl or aryl group, reacts with an alcohol, such as ethyl alcohol, to form a urethane as an addition product. Thus:

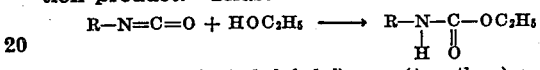

(An isocyanate)   (Ethyl alcohol)   (A urethane)

When a di-isocyanate is used, a bi-functional molecule is available which can serve as a polymerizing agent when reacted with another molecule containing more than one functional group, each group having at least one active or labile hydrogen atom. Thus:

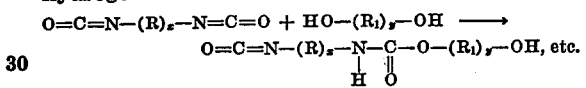

where $(R)_x$ and $(R_1)_y$ represent intervening structure between the terminal functional groups.

The above reaction will theoretically produce a large molecule that is always thermoplastic or heat sensitive because the polymer is predominantly linear and although there may be some branching, the molecule still remains a single macro-molecule isolated from surrounding molecules as far as chemical covalent bonds are concerned so that its motion is not limited or its position with relationship to other molecules fixed. A more rigid and less heat-sensitive resin can be formed if some molecules are introduced having more than two functional groups, each group containing at least one reactive hydrogen atom. Thus if an alkyd type resin is formed by reacting glycerol which is tri-functional with adipic acid which is bi-functional to a stage corresponding roughly to a "B" stage resin the resultant syrupy resin can quickly be taken to the final stage of resinification where it is rigid, insoluble and less heat sensitive, by reacting it with a di-isocyanate, such as meta toluene di-isocyanate through a process of polymerization or addition reaction, the labile hydrogen atoms of the free OH groups of the alkyd resin molecule adding to the isocyanate molecule producing a cross-linked three dimensional molecule. Molecules of three dimensional extension have restricted and finally arrested motion. Thus gel formation in polymerization does not necessarily depend upon the production of giant molecules but may occur if there is a sufficiently high concentration of cross-linked three dimensional molecules having only a comparatively low degree of polymerization.

In accordance with this method we employ alkyd resins or the reaction products of polyhydric alcohols and polybasic acids unmodified or modified with oils and/or other resins, and having the following ratios of hydroxyl groups to carboxyl groups in the alkyd resin reactants.

From 3 hydroxyl (OH) : 1 carboxyl (COOH)
To 4 hydroxyl (OH) : 5 carboxyl (COOH)

A resin of this character is reacted with a poly-isocyanate, a selected proportion of a metallic soap powder, or a selected proportion of a metallic soap powder and a metallic leafing powder, the metallic soap powder or the mixture of the metallic soap powder and metallic leafing powder being added to the reactant mixture to produce a low density cellular plastic of superior characteristics.

It is an object of this invention to provide a simple, inexpensive and commercially practical method for producing light-weight foamed or cellular plastics which method completely avoids the necessity for employing costly special equipment and permits the direct and final application of the reactant materials so as to immediately and permanently bond with the walls or surfaces of the cavity, panel, plate or other structural part and to thereafter maintain a strong, rigid connection therewith. In employing the method of the invention the several ingredients are simply mixed together and the resultant mixture is poured or applied to thereafter react and form a low density strong cellular plastic which may be allowed to permanently bond with the surfaces to which it is applied, no machinery or equipment being needed to control or release pressures or the like.

Another object of the invention is to obtain the production of a cellular plastic of greatly increased volume and reduced density, having individual non-communicating cells of substantially uniform size and shape. We have found that by incorporating a metallic soap, or a metallic soap and a metallic leafing powder, in the reactant mixture of the alkyd resin and the poly-isocyanate, the resultant foamed plastic material is increased many times in volume and, accordingly, has a greatly reduced density and is of uniform cellular structure having a multitude of substantially identical spherical cells attached to one another by thin membranes. When a combination of the metallic soap and the metallic leafing powder is used, the action appears to be synergistic, that is the combination of such fillers results in the production of a foamed plastic of much greater volume than if comparable proportions of such fillers are used separately.

Another object of the invention is to provide a method for making cellular plastics which reduces the tendency for premature reaction of the alkyd resin-poly-isocyanate mixture, thereby facilitating the mixing and application or pouring of the material. The addition of the metallic soap, or the metallic soap and metallic leafing powder fillers, greatly facilitates the mixing and pouring of the reactant components since it minimizes the tendency for premature reaction which might otherwise accompany prolonged mixing and/or pouring operations.

A further object of the invention is to provide a foamed plastic material of the character referred to in which the metallic soap powder, or the metallic leafing powder and the metallic soap powder, serves to reinforce and strengthen the cellular structure. Thus in addition to increasing the volume manyfold and in obtaining a uniform cellular structure, the filler or fillers reinforce the final product.

The method of the present invention includes, generally, the mixing of an alkyd resin, a poly-isocyanate and a metallic soap powder in selected proportions and the pouring or application of the resultant mixture to react without applied external pressure and with or without the application of external heat and with or without a post curing at slightly elevated temperatures. The invention also comprehends the use of a metallic leafing powder in addition to the metallic soap powder with the reactant alkyd resin, poly-isocyanate mixture to obtain an increased volume in the cellular product.

The resins which we employ in the formulation and method are the reaction products of polyhydric alcohols and polybasic acids unmodified or modified with oil and/or other resins, having an acid number of from 5 to 80 and having the following ratio range of the hydroxyl groups to the carboxyl groups in the reactants of the resin:

From 3 hydroxyl (OH) : 1 carboxyl (COOH)
To 4 hydroxyl (OH) : 5 carboxyl (COOH)

We have found that in practice it is preferred to employ resins having an acid number between approximately 10 and approximately 25 and wherein the ratio of the hydroxyl groups to the carboxyl groups is 2:1 although satisfactory results have been obtained by employing resins having the foregoing ranges of acid numbers and ratios of the hydroxyl and carboxyl groups of their reactants. The following formula has been found to be suitable for preparing unmodified alkyd resins from a polyhydric alcohol and polybasic acids, yielding a resin having an acid number of from 5 to 80, preferably approximately 15, and a water content of about 0.3% by weight:

FORMULA A

| | Mols |
|---|---|
| Glycerol | 4 |
| Adipic acid | 2.5 |
| Phthalic anhydride | 0.5 |

An alkyd resin of Formula A is mixed with the di-isocyanate and the metallic soap powder or the metallic soap powder and a metallic leafing powder, to produce a foamed or cellular plastic, the density of the product being controlled by the water content of the resin, the acid number of the resin and the percentage or proportion of the filler employed. Formula A may, if desired, be modified by employing from 3 to 5 mols of glycerol, from 1.5 to 3 of adipic acid, and from 0.1 to 1.5 mols of phthalic anhydride. The ingredients of Formula A are reacted in an open vessel to have the selected acid number of from 5 to 80 and the selected water content of from 0.1% to 2.5% by weight. Other unmodified alkyd resins prepared from polyhydric alcohols and polybasic acids which are practical and effective in preparing the cellular plastic of the invention are:

FORMULA B

| | Mols |
|---|---|
| Glycerol | 2 |
| 1,4 butylene glycol | 1 |
| Adipic acid | 2 |

FORMULA C

| | Mols |
|---|---|
| Trimethylol propane | 4 |
| Adipic acid | 2.5 |
| Phthalic anhydride | 0.5 |

FORMULA D

| | Mols |
|---|---|
| Glycerol | 2 |
| Pentaerithritol | 0.5 |
| Phthalic anhydride | 1 |
| Sebacic acid | 3 |

The ratios of the hydroxyl groups to the carboxyl groups in Formulae A, B, C and D are respectively 2(OH):1(COOH), 2(OH):1(COOH), 2(OH):1(COOH), and 1(OH):1(COOH).

The following Formulae E, F and G are typical or representative of formulae that may be employed in preparing unmodified alkyd resins from single polyhydric alcohols and single polybasic acids suitable for use in the method and products of the invention:

FORMULA E

| | Mols |
|---|---|
| Glycerol | 4 |
| Adipic acid | 3 |

FORMULA F

| | Mols |
|---|---|
| Trimethylol propane | 3 |
| Phthalic anhydride | 2 |

FORMULA G

| | Mols |
|---|---|
| Glycerol | 1 |
| Phthalic anhydride | 1.5 |

The respective ratios of the hydroxyl groups to carboxyl groups of Formulae E, F and G are 2(OH):1(COOH), 9(OH):4(COOH) and 1(OH):1(COOH).

Examples of alkyd resins, oil modified that have been found to be practical and operative in preparing the cellular plastic materials in accordance with the invention are found in Formulae H and I where the ratio of the hydroxyl groups to the carboxyl groups in the reactants are 3(OH):3½(COOH) and 6(OH):7(COOH) respectively.

FORMULA H

| | Mols |
|---|---|
| Glycerol | 1 |
| Phthalic anhydride | 1.5 |
| Oleic acid | 0.5 |

FORMULA I

| | Mols |
|---|---|
| Diethylene glycol | 5 |
| Adipic acid | 5 |
| Citric acid | 1 |
| Lactic acid | 1 |

Another example of an oil modified alkyd resin which we have found to be effective in preparing the cellular plastic is set forth in Formula J where the ratio of the hydroxyl and carboxyl groups in the resin reactants is 10(OH):9(COOH) where the (OH) group in the ricinoleic acid or the 3(OH) groups for the castor oil molecule is taken into account or 7½(OH):9(COOH) when the (OH) groups in the ricinoleic acid is not considered.

FORMULA J

| | Mols |
|---|---|
| Glycerol | 2.5 |
| Adipic acid | 4 |
| Castor oil | 1 |
| Maleic anhydride | ½ |

An example of a natural resin modified alkyd resin suitable for use in the method and cellular products of the invention is found in Formula K where the ratio of the hydroxyl to the carboxyl groups of the alkyd resin reactants is 1(OH):1(COOH).

FORMULA K

| | |
|---|---|
| Glycerol | gram mols 1 |
| Sebacic acid | do 1½ |
| Resin copal | grams 100 |

An example of a synthetic resin modified alkyd resin adapted for use in the formulations and method of the invention is set forth below in Formula L where the ratio of the hydroxyl groups to carboxyl groups of the alkyd resin reactants is 3(OH):2(COOH).

FORMULA L

| | |
|---|---|
| Phenol | 50 grams |
| Formaldehyde | 17 grams |
| Rosin | 65 grams |
| Phthalic anhydride | 30 grams or 0.2 gram mol |
| Glycerol | 18.4 grams or 0.2 gram mol |

The isocyanate which is reacted with the selected alkyd resin in the production of the cellular plastic, is a poly-isocyanate such as meta toluene di-isocyanate. The di-isocyanate is used in the proportion of approximately 35 to approximately 150 parts by weight to 100 parts by weight of the alkyd resin, depending upon the quantity of water present in the resin component, the acid number of the resin and the type and quantity of the metallic soap powder or the amount of the metallic soap and metallic leafing powder employed. Some reactions between an isocyanate and water may be represented by the following in which R may be either an alkyl or aryl group:

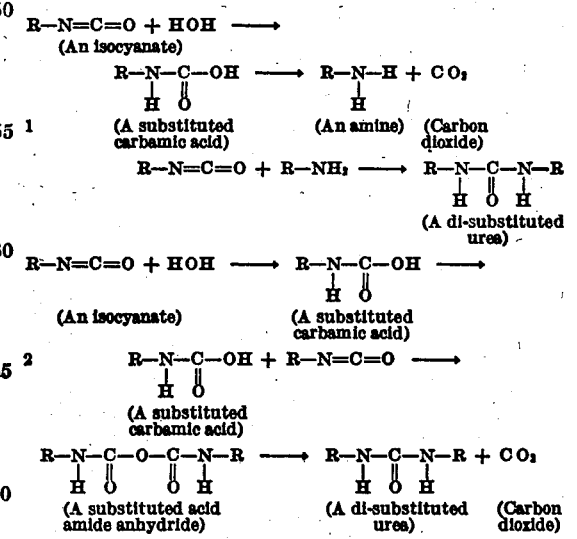

By incorporating a selected proportion of a metallic soap powder in the alkyd resin di-isocyanate mixture, results are obtained that are greatly superior to results obtainable by reacting the alkyd resin and di-isocyanate alone. The addition of a suitable proportion of a metallic soap powder or a metallic soap powder and a metallic leafing powder to the alkyd resin di-isocyanate mixture produces a cellular plastic having a much lower density, a greatly increased volume, more uniform and symmetrical cells, and having greater physical strength. For example, if 30 grams of the alkyd resin of Formula A, having an acid number of 14 and a water content of 0.13% by weight, and 20 grams of meta toluene di-isocyanate are mixed together and allowed to react at atmospheric pressure, a body of cellular plastic having a volume of 3.75 cubic inches is obtained. By contrast, when 30 grams of the same alkyd resin of Formula A, 20 grams of meta toluene di-isocyanate, and 1 gram of zinc stearate powder are mixed together and allowed to react at atmospheric pressure, a body of foamed plastic having a volume of 9.8 cubic inches is obtained. From this comparison it will be seen that the density of the cellular plastic is greatly reduced when a metallic soap powder is used even though a pigment, the soap powder, has been added to the same quantities of the identical alkyd resin di-isocyanate mixture.

This unusual and unexpected action may have several explanations and it is to be understood that we do not wish to be restricted to the theories set forth herein. The metallic soap powder may produce film stabilization by the concentration of solid particles at the interface increasing the viscosity and film strength of the film surrounding the gas bubbles. The metallic soap powder may act as an anti-coagulating agent by concentrating at the inter-face of the film enclosing the gas cell providing slippage planes and preventing contact and agglomeration of the individual cells. Further, the metallic soap powder may serve to lower surface tension and still maintain cell stabilization. Thus, surface energy can be considered as the product of the intensity factor (surface tension) and the capacity factor (surface area) and by decreasing the surface tension a large sphere or cell more readily divides into a multiplicity of cells similarly stablized.

The metallic soap powders which we have found to be effective and practical in the method and formulations of the invention are metallic soaps of fatty acids having from 12 to 20 carbon atoms. Included in this category or class are:

Zinc stearate
Aluminum stearate
Calcium stearate
Magnesium stearate
Magnesium hydroxy stearate
Barium stearate
Zinc laurate
Calcium oleate
Strontium stearate The percentage or proportion of the metallic soap powder employed may be varied considerably in the cellular plastic formulations. Thus it has been found that from $\frac{1}{16}$ gram to 7½ grams of the selected metallic soap powder may be used for each 30 grams of the alkyd resin of the alkyd resin di-isocyanate reactant mixture.

The following are typical examples of the formulations of the invention employing metallic soap powders and productive of low density, large volume cellular plastic materials of uniform spherical cell structure:

EXAMPLE I

| | Grams |
|---|---|
| Alkyd resin of Formula A having an acid number of 14 and a water content of 0.31% by weight | 30 |
| Meta toluene di-isocyanate | 20 |
| Zinc stearate powder | ½ |

In the formulation of Example I from 10 to 40 grams of the meta toluene di-isocyanate and from $\frac{1}{16}$ to 7½ grams of the zinc stearate powder may be used with each 30 grams of the alkyd resin.

EXAMPLE II

| | Grams |
|---|---|
| Alkyd resin of Formula A having an acid number of 14 and a water content of 0.31% by weight | 30 |
| Meta toluene di-isocyanate | 20 |
| Aluminum stearate powder | 1 |

With the quantities specified in Example II the mixture, when allowed to react at atmospheric pressure yields a cellular plastic body of 8.25 cubic inches. In this formulation from 10 to 40 grams of the meta toluene di-isocyanate and from $\frac{1}{16}$ to 7½ grams of the aluminum stearate powder may be used with each 30 grams of the alkyd resin.

EXAMPLE III

| | Grams |
|---|---|
| Alkyd resin of Formula A having an acid number of 14 and a water content of 0.31% by weight | 30 |
| Meta toluene di-isocyanate | 20 |
| Magnesium hydroxy stearate powder | 1 |

In this case the specified quantities of the ingredients when mixed and allowed to react at atmospheric pressure, produce a cellular plastic body of 10½ cubic inches. In Example III from 10 to 40 grams of the meta toluene di-isocyanate and from $\frac{1}{16}$ to 7½ grams of the magnesium hydroxy stearate powder may be used with each 30 grams of the alkyd resin.

EXAMPLE IV

| | Grams |
|---|---|
| Alkyd resin of Formula A having an acid number of 14 and a water content of 0.31% by weight | 30 |
| Meta toluene di-isocyanate | 20 |
| Calcium stearate powder | 1 |

With these proportions and quantities, the mixture, when allowed to react at atmospheric pressure, yields 11.6 cubic inches of foamed or cellular plastic material. In Example IV from 10 to 40 grams of the meta toluene di-isocyanate and from $\frac{1}{16}$ to 7½ grams of the calcium stearate powder may be used for each 30 grams of the alkyd resin.

EXAMPLE V

| | Grams |
|---|---|
| Alkyd resin of Formula A having an acid number of 14 and a water content of 0.23% by weight | 30 |
| Meta toluene di-isocyanate | 20 |
| Zinc stearate | 1 |

When these ingredients are mixed and allowed to react at atmospheric pressure they yield 10½ cubic inches of foamed or cellular plastic. In Example V from 10 to 40 grams of the meta toluene di-isocyanate and from $\frac{1}{16}$ to 7½ grams of the zinc stearate may be employed with each 30 grams of the alkyd resin.

EXAMPLE VI

| | Grams |
|---|---|
| Alkyd resin of Formula A having an acid number of 14 and a water content of 2.14% by weight | 30 |
| Meta toluene di-isocyanate | 23 |
| Zinc stearate | 1 |

These ingredients when mixed and allowed to react at atmospheric pressure yield 18 cubic inches of the cellular plastic. In Example VI from 15 to 45 grams of the meta toluene di-isocyanate and from 1/16 to 7½ grams of the zinc stearate may be used for each 30 grams of the alkyd resin.

EXAMPLE VII

| | Grams |
|---|---|
| Alkyd resin of Formula A having an acid number of 14 and a water content of 1.0% by weight | 30 |
| Meta toluene di-isocyanate | 20 |
| Zinc stearate | 1 |

These ingredients, when mixed and allowed to react at atmospheric pressure, yield 16 cubic inches of the cellular plastic material. If desired, from 12½ to 42½ grams of the meta toluene di-isocyanate and from 1/16 to 7½ grams of the zinc stearate may be employed with each 30 grams of the alkyd resin.

EXAMPLE VIII

| | Grams |
|---|---|
| Alkyd resin of Formula A having an acid number of 14 and a water content of 2.14% by weight | 30 |
| Meta toluene di-isocyanate | 23 |
| Zinc stearate | 2 |

When these ingredients in the proportions set forth are mixed and allowed to react at atmospheric pressure, they yield 22½ cubic inches of the cellular plastic. From 15 to 45 grams of the meta toluene di-isocyanate and from 1/16 to 7½ grams of the zinc stearate may be used with each 30 grams of the alkyd resin in Example VII. It is of interest to compare Examples VI and VIII. Thus, although an additional proportion of pigment, necessarily increasing the weight of the mixture, is employed in Example VIII the resultant foamed plastic body has a lower calculated density than the plastic body of Example VI, the formulation of Example VIII yielding a cellular plastic having a density of 9.3 pounds per cubic foot while the formulation of Example VI yields a cellular plastic having a density of 11.4 pounds per cubic foot.

EXAMPLE IX

| | Grams |
|---|---|
| Alkyd resin of Formula A having an acid number of 14 and a water content of 0.56% by weight | 30 |
| Meta toluene di-isocyanate | 20 |
| Zinc stearate | 1 |

These ingredients, in the proportions named, yield 13 cubic inches of the foamed or cellular plastic material. From 10 to 40 grams of the meta toluene di-isocyanate and from 1/16 to 7½ grams of the zinc stearate may be used with each 30 grams of the alkyd resin of Example IX.

EXAMPLE X

| | Grams |
|---|---|
| Alkyd resin of Formula A having an acid number of 34 and a water content of 1.4% by weight | 30 |
| Meta toluene di-isocyanate | 20 |
| Barium stearate | 2 |

In Example X from 12½ to 42½ grams of the meta toluene di-isocyanate and from 1/16 to 7½ grams of the barium stearate may be used with each 30 grams of the alkyd resin.

EXAMPLE XI

| | Grams |
|---|---|
| Alkyd resin of Formula A having an acid number of 14 and a water content of 0.56% by weight | 30 |
| Meta toluene di-isocyanate | 20 |
| Zinc stearate | ¾ |
| Calcium stearate | ¼ |

It will be observed that in Example XI a mixture or combination of metallic soaps is employed in the formulation.

Where the metallic soaps are employed in the reactant alkyd resin-di-isocyanate mixture in the manner above described, the resultant foamed or cellular plastic has greater toughness, resiliency and compressive strength than heretofore obtained. The structure of the cellular product is characterized by large cell nuclei set in matrix of small cells.

As mentioned above, excellent results are obtained when both a metallic soap powder and a metallic leafing powder are incorporated in the alkyd resin di-isocyanate mixture. Such a combination of fillers appears to act synergistically, that is the combination of the metallic soap powder and the metallic leafing powder causes the formation of a greater volume of the cellular plastic than if the same proportionate quantity of each filler is used separately in the identical alkyd resin di-isocyanate mixture. The use of the metallic soaps in combination with the metallic leafing powders produces a conditioned arrangement of the cells, the extent of this conditioning being adjustable by varying the ratio of the metallic soap and metallic leafing powder content. The term "leafing" powder as herein employed refers to a material having the property of leafing when suspended in a suitable liquid vehicle and when suspended in such a vehicle and applied as a paint, has the ability of forming a continuous film on the surface of the applied vehicle or paint. Such powders exhibit good leafing properties in paint to the end that paint containing the same is free flowing and produces a continuous, smooth, lustrous coating. In one conventional method of manufacturing leafing powders small thin pieces of the selected metal are treated in a stamping mill lubricated with a suitable lubricant such as stearic acid which coats the individual flakes as they are pounded in the mill, thereby preventing the particles from adhering when brought together under pressure. As the stamping proceeds in the stamping mill the pieces of metal become thinner and smaller. When the desired fineness is obtained the powder is screened and separated into various grades. The powder, although now finely divided is not suitable for incorporation in the foamed plastic materials of the invention. The powder must be polished before it will exhibit the desired leafing characteristics which suit it for use in the present method. This may be accomplished by charging the powder into a drum together with a lubricant, usually stearic acid, the drum having irregular surfaces and being equipped with bristle brushes mounted on a central axle so that the brushes bear lightly on the inside wall of the drum. The brushes and the drum are then rotated relative to one another. During this action the powder flakes are rubbed by the brushes against the wall of the drum and against other flakes so that the flakes are gradually smoothed and coated with a thin layer of the lubricant. After polishing the powder is packed and stored for several weeks, it having been found that some aging is required for the best leafing action of the powder. It is to be understood that this is one conventional method of preparing leafing powders and there are other procedures such as the processing of finely divided aluminum in ball mills in the presence of a lubricating or leafing agent and mineral spirits.

The metallic leafing powders which we have found to be practical and effective in combination with the metallic soap powders in the formulation of the cellular plastic material include:

Aluminum leafing powder
Aluminum bronze leafing powder
Gold bronze leafing powder
Copper bronze leafing powder
Lead leafing powder
Nickel leafing powder
Silver leafing powder
Gold leafing powder
Copper leafing powder
Stainless steel leafing powder—18:8 chromium nickel.

The following are examples of formulations of the invention incorporating both metallic soap powders and metallic leafing powders to obtain a cellular plastic material of increased volume and reduced density:

EXAMPLE XII

| | Grams |
|---|---|
| Alkyd resin of Formula A having an acid number of 14 and a water content of 0.31% by weight | 30 |
| Meta toluene di-isocyanate | 20 |
| 422 mesh aluminum leafing powder | ½ |
| Zinc stearate powder | ½ |

With these proportions and quantities, the mixture, when allowed to react at atmospheric pressure, yields 9¾ cubic inches of the cellular plastic. When the metallic leafing powders and metallic soaps are both used in such formulations the metallic leafing powder may be used in the proportion of from $\frac{1}{8}$ to 5 grams for each 30 grams of the alkyd resin and the metallic soaps may be used in the proportion of from $\frac{1}{8}$ to 5 grams for each 30 grams of the resin.

EXAMPLE XIII

| | Grams |
|---|---|
| Alkyd resin of Formula A having an acid number of 14 and a water content of 0.31% by weight | 30 |
| Meta toluene di-isocyanate | 20 |
| 422 mesh aluminum leafing powder | 1 |
| Zinc stearate powder | ½ |

This mixture will yield 12 cubic inches of the foamed plastic when allowed to react at atmospheric pressure.

EXAMPLE XIV

| | Grams |
|---|---|
| Alkyd resin of Formula A having an acid number of 14 and a water content of 0.31% by weight | 30 |
| Meta toluene di-isocyanate | 20 |
| 422 mesh aluminum leafing powder | 1 |
| Zinc stearate powder | ¼ |

In this formulation from 10 to 40 grams of the meta toluene di-isocyanate, from $\frac{1}{8}$ to 5 grams of the aluminum leafing powder, and from $\frac{1}{8}$ to 5 grams of the zinc stearate powder may be used for each 30 grams of the alkyd resin.

EXAMPLE XV

| | Grams |
|---|---|
| Alkyd resin of Formula A having an acid number of 14 and a water content of 0.53% by weight | 30 |
| Meta toluene di-isocyanate | 20 |
| 422 mesh aluminum leafing powder | 1 |
| Zinc stearate powder | ¼ |

In Example XV from 10 to 40 grams of the meta toluene di-isocyanate, from $\frac{1}{8}$ to 5 grams of the aluminum leafing powder, and from $\frac{1}{8}$ to 5 grams of the zinc stearate powder may be used for each 30 grams of the alkyd resin.

EXAMPLE XVI

| | Grams |
|---|---|
| Alkyd resin of Formula A having an acid number of 14 and a water content of 1% by weight | 30 |
| Meta toluene di-isocyanate | 20 |
| 422 mesh aluminum leafing powder | 2½ |
| Zinc stearate powder | ¼ |

In this formulation from 12½ to 42½ grams of the meta toluene di-isocyanate, from $\frac{1}{8}$ to 5 grams of the aluminum leafing powder and from $\frac{1}{8}$ to 5 grams of the zinc stearate powder may be used for each 30 grams of the alkyd resin.

EXAMPLE XVII

| | Grams |
|---|---|
| Alkyd resin of Formula A having an acid number of 20 and a water content of 0.35% by weight | 30 |
| Meta toluene di-isocyanate | 20 |
| Strontium stearate powder | 0.75 |
| 422 mesh aluminum leafing powder | 0.75 |

In this formulation from 10 to 40 grams of the meta toluene di-isocyanate, and from $\frac{1}{8}$ to 5 grams of each of the aluminum leafing powder and strontium stearate powder may be used with each 30 grams of the alkyd resin.

Excellent results are obtained and a strong, low density cellular plastic having uniform individual cells may be produced by employing as the alkyd resin component of the reactant mixture both an alkyd resin having a low acid number and an alkyd resin having an intermediate acid number. The following is an example of this type or class of formulation:

EXAMPLE XVIII

| | Grams |
|---|---|
| Alkyd resin of Formula A having an acid number of 10 and a water content of 0.2% by weight | 5 |
| Alkyd resin of Formula A having an acid number of 46 and a water content of 0.9% by weight | 25 |
| Meta toluene di-isocyanate | 20 |
| Zinc stearate powder | 2 |

In this formulation from 5 to 25 grams of the alkyd resin having an acid number of 10 and from 25 to 5 grams of the alkyd resin having an acid number of 46 may be used. Furthermore, the proportion of the meta toluene di-isocyanate may range from 10 to 40 grams and from $\frac{1}{16}$ to 7½ grams of the zinc stearate powder may be used with 30 grams total of the alkyd resin components.

The physical properties of the cellular plastic material produced by the method of the invention will depend upon the nature of the alkyd resin employed in the formulations. For example, when the resins of Formulae A, C and F are reacted with the meta toluene di-isocyanate and the metallic soap powders with or without the metallic leafing powders, strong rigid cellular plastics result. When the alkyd resins of Formulae B, E, H and K are employed, the resultant foamed plastics will be less rigid and when the resins of Formulae I and J are reacted with the meta toluene di-isocyanate and the metallic soap powders with or without the metallic leafing powders, the resultant foamed plastics approach a rubbery state.

In preparing the cellular plastic materials of the invention the alkyd resin or resins, the meta toluene di-isocyanate and the metallic soap powder, with or without the leafing powder, are thoroughly mixed in the ratio designed to produce a foamed plastic having the desired density, etc. This mixture is then poured into the mold or cavity in the structure in which it is to form a part or is applied to a selected surface and is allowed to react at atmospheric pressure either with or without the application of external heat or attended by moderate heating of, say, between 120° F. and 150° F. depending upon the size of the mold or cavity or upon the mass of the material. The alkyd resin di-isocyanate filler powder mixture is simply allowed to react and the reaction is permitted to go on to completion to produce the cellular plastic. A post-curing operation of from 10 to 20 hours at a temperature of 125° F. to 225° F. may be desirable to continue the polymerization reaction and thus produce a more heat stable and more solvent resistant cellular material. In practice, the foamed or cellular plastic material produced in this manner is uniform throughout in its cellular structure having generally spherical noncommunicating cells of like size and the material is physically strong and of extremely low density. It is to be noted that no special pressure applying or pressure regulating equipment is required for the process and that only simple mixing and heating techniques are employed.

It should be understood that the invention is not based upon or dependent upon the series we have expressed. Nor is the invention to be regarded as limited to the expressed procedure or materials set forth, these details being given only by way of illustration and to aid in qualifying the invention. We do not regard such specific details as essential to the invention except insofar as they are expressed by way of limitation in the following claim in which it is our intention to claim all novelty inherent in the invention as broadly as is permissible in view of the art.

We claim:

The method of making a cellular plastic material which comprises providing an alkyd resin wherein the hydroxyl and carboxyl groups in the alkyd resin reactants are in the ratio range of from 3(OH) : 1(COOH) to 4(OH) : 5(COOH) and having a water content of from 0.1% to 2.5% by weight and an acid number of from 5 to 80, mixing the following with 100 parts by weight of said resin; from 35 to 150 parts by weight of meta toluene di-isocyanate, from 0.21 to 16.5 parts by weight of a metallic soap powder chosen from the group consisting of:

Zinc stearate
Aluminum stearate
Calcium stearate
Magnesium stearate
Magnesium hydroxy stearate
Barium stearate
Zinc laurate
Calcium oleate
Strontium stearate and from 0.21 to 16.5 parts by weight of a metallic leafing powder chosen from the group consisting of:

Aluminum leafing powder
Aluminum bronze leafing powder
Gold bronze leafing powder
Copper leafing powder
Copper bronze leafing powder
Lead leafing powder
Nickel leafing powder
Silver leafing powder
Gold leafing powder
Stainless steel leafing powder and allowing the mixture to react at atmospheric pressure.

ELI SIMON.
FRANK W. THOMAS.

REFERENCES CITED

The following references are of record in the file of this patent:

UNITED STATES PATENTS

| Number | Name | Date |
|---|---|---|
| 2,268,160 | Miles | Dec. 30, 1941 |
| 2,374,136 | Rothrock | Apr. 17, 1945 |
| 2,461,761 | Nye | Feb. 15, 1949 |

OTHER REFERENCES

German Plastics Practice by De Bell et al., 1946, pages 301, 310, 316 and 463 to 465.